Jan. 29, 1935. N. CARO ET AL 1,989,267
PRODUCTION OF NITRIC ACID AND LIQUID NITROGEN TETROXIDE
Filed July 5, 1929
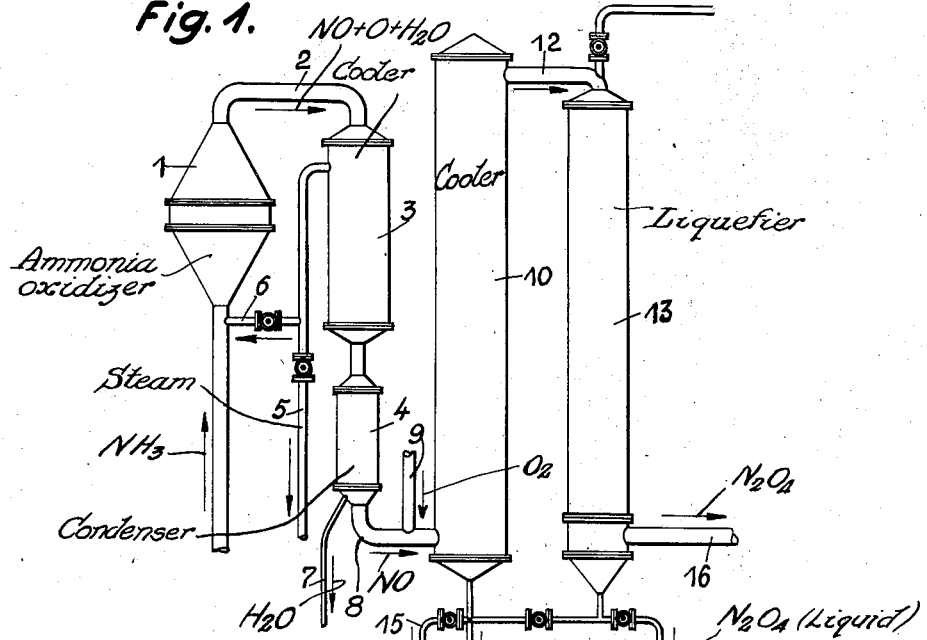
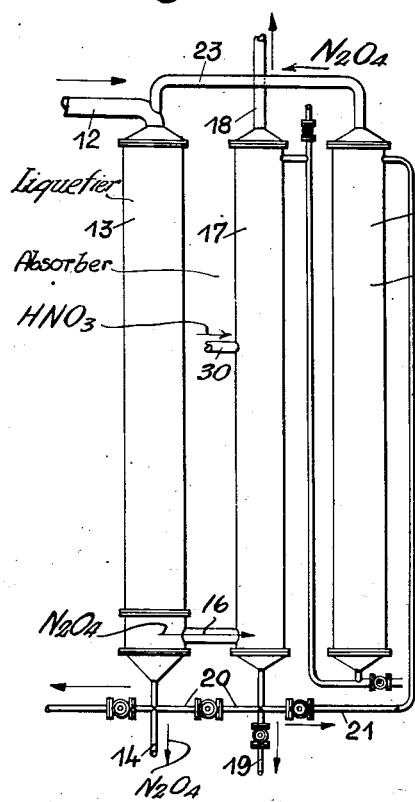
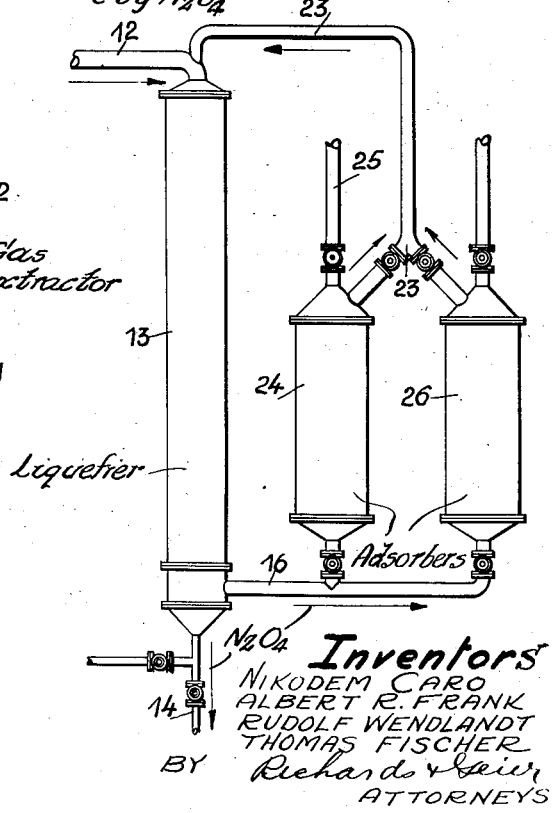
Inventors
NIKODEM CARO
ALBERT R. FRANK
RUDOLF WENDLANDT
THOMAS FISCHER
BY Richards & Geier
ATTORNEYS Patented Jan. 29, 1935

1,989,267

UNITED STATES PATENT OFFICE 1,989,267

PRODUCTION OF NITRIC ACID AND LIQUID NITROGEN TETROXIDE

Nikodem Caro and Albert Rudolf Frank, Berlin, and Rudolf Wendlandt and Thomas Fischer, Piesteritz, near Wittenberg, Germany Application July 5, 1929, Serial No. 376,266
In Germany November 9, 1926

12 Claims. (Cl. 23—160)

This invention relates to a process for converting the whole of the nitric oxide (NO), produced by combustion of ammonia, to highly concentrated nitric acid or to liquid nitrogen tetroxide without utilizing sulphuric acid to bind an excess of water and without distillation of dilute nitric acid.

Hitherto, this conversion has not been effected in a satisfactory manner. It has been proposed to dry the gases and to separate the water as free from acid as possible. It has however not been found possible to effect this water separation satisfactorily because either a large portion of the yield is converted into aqueous nitric acid or a considerable proportion of the nitrogen compounds is lost in the water. This is the case even when the water, as poor in acid as possible, is removed immediately after leaving the apparatus used for the combustion of the ammonia, and is especially so in the case of concentrated mixtures or in mixtures enriched with oxygen. The losses are particularly serious when the separation of the water takes place only after the heat of the nitric oxide mixture has been utilized in a waste heat boiler. The preparation of the nitrogen tetroxide is rendered still more difficult as the gas mixture obtained is not dry.

It has now been found in accordance with this invention that the above mentioned disadvantages may be avoided if a portion only of the steam is withdrawn without allowing any considerable oxidation prior to or during this first working phase, so that in the second phase the residual water separates as nitric acid, during of after the oxidation of the nitric oxide, and in the third phase nitrogen tetroxide or highly concentrated nitric acid is produced.

At first only a portion of the steam is separated by cooling without allowing any considerable oxidation of the nitric oxide mixture to take place. As the whole of the steam is not to be removed the separation can take place much more rapidly and at a high discharge temperature. Both these circumstances tend to prevent the oxidation of the nitric oxide and the absorption of nitrogen oxides in the separated water. Addition of oxygen, if necessary, takes place only after the first phase.

In the second phase the residual water vapour is separated during or after the oxidation of the nitric oxide (NO). The oxidation of NO to $NO_2$ as well as the separation of the acid is promoted by decreasing the temperature. The condensate obtained during the second phase may be collected in one or two stages of concentration. In this manner, tetroxide-containing acid of very low water vapour pressure is finally separated from the oxidized gases.

In the third phase nitrogen tetroxide or highly concentrated nitric acid is produced, for example by cooling the gas to a low temperature, if necessary in stages. Also substances may be employed—if necessary in stages—which lower the vapour pressure of the tetroxide or have absorbing properties. Substances which are dissolved in the condensed nitrogen tetroxide, lower the vapour pressure of the liquid. Solvents which dissolve the tetroxide are also adapted to lower the vapour pressure of the tetroxide. Solid adsorption agents lower the vapour pressure of the tetroxide by adsorption. An example of dissolved substances is nitric acid. Nitric acid is also an example of a solvent. An example of a solid adsorption agent is silica gel. We wish it to be understood, that in the third phase according to the present invention an excess of water is impossible, and therefore we make no claim to any process for eliminating water from the liquid, or dissolved or adsorbed products of the third phase or from any mixture containing the liquid and the dissolved or adsorbed products of the third phase. The gas mixture may be liquefied, and then the residual gas mixture washed with a solvent or adsorbed. The liquefaction, solution or adsorption may take place at low temperature, if necessary, in several stages, and also solid oxides of nitrogen may be frozen out. Dissolved or adsorbed or solid nitrogen tetroxide may be added as such, or after melting or vaporizing, to the liquid nitrogen tetroxide, or to the crude mixture of nitrogen tetroxide and nitric acid.

When it is only a question of drying, the water separation in the first phase may be extensive. For the production of highly concentrated nitric acid sufficient water vapour can be allowed to enter the second phase so that the condensates of the second and third phases which may be united together or employed for the mutual irrigation or scrubbing and absorption give a mixture suitable for the production of highly concentrated nitric acid. In many cases the water vapour and nitrogen tetroxide may pass to the second phase in approximately equimolecular proportions. The union of the condensates from the second and third phases may be effected, for example, continuously, in any suitable manner; a condensate system may be irrigated or the like by its condensate or by the condensate from another system by means of a cycle, direct current, counter current, etc. The crude mixture of nitrogen tetroxide and nitric acid is converted into highly concentrated nitric acid of any desired concentration, e. g. 98-100% nitric acid free from tetroxide can be produced, by using oxygen under pressure preferably at increased temperature. It is obvious that weaker acids may be produced, the water content varying according to the special purposes for which it is required and the conditions used.

As the condensates from the second and third phase together give a crude mixture adapted for working up to highly concentrated nitric acid, the condensation may take place in one phase, the second and third phases being combined.

Special advantages are obtained by the use of increased pressure; the whole plant may work at increased pressure, or the ammonia oxidation may be carried out at atmospheric pressure this being in many cases a special advantage of this invention, the gas mixture being compressed only after leaving the combustion apparatus or only after the first water separation or even only after the separation of the acid is complete. The technical difficulties of this compression are avoided when it is carried out in a turbo-compressor. The expansion of the gases remaining after the absorption is then carried out preferably in an expansion turbine which is coupled with the compressor. Pressures of for example 5 to 10 atms. may be employed. It is especially advantageous to use the end gas at increased pressure, if necessary by changing its temperature by passing it through a heat-exchanger prior to the expansion and with work done during the expansion. The increased pressure may be used in several stages.

Oxygen-containing compressed residual gas may enter pressure spaces to which condensates from the second and third phase (or crude mixtures of nitrogen tetroxide and nitric acid or condensate obtained during the compression) may be admitted. Very high pressures may also be used, for example 50 to 200 atms. In this manner the residual gas may be worked up by means of pressure into highly concentrated nitric acid. The gas coming from the second phase may also be passed already compressed into the pressure space, to which condensate from the second phase is supplied. In the third phase finally worked up highly concentrated nitric acid is obtained preferably at increased temperature, if desired by using the heat from the compression.

By the application of the methods described the quantity of nitric oxide remaining in the gaseous state in the waste gas can be reduced at will so that it may be neglected in the working up of low percentage gases, or the said nitric oxide may be washed with water, for example with condensed water coming from the first phase, and converted by that water and the oxygen contained in the end gas into aqueous nitric acid, if there should be any demand for the same.

The details of the method and the temperature conditions depend upon the concentration, and the steam and oxygen content of the nitric oxide mixture, with high percentage mixtures from the combustion of ammonia with pure oxygen, if desired with the addition of steam, the gas discharge temperature of the first phase may be, in certain circumstances, above 100° C. sometimes even considerably above. With gases from a normal ammonia combustion with atmospheric air at atmospheric pressure this temperature might be much lower for example 45° C. The conditions for the other phases differ similarly.

The application of the process of this invention is not limited to the ammonia combustion mixtures but extends to all moist nitrous gases which are treated in a corresponding manner. The principal value of the process is the possibility of producing as much highly concentrated nitric acid as is required or a crude mixture which is capable of being converted directly into highly concentrated nitric acid.

In all the processes for the production of nitric acid as described the residual gas of the condensation can obviously be utilized or worked up to nitrogen or oxygen according to its composition.

The following example which refers to the accompanying diagrammatic drawing illustrates one method of carrying the invention into effect:

Referring to Figure 1, a nitrogen oxide mixture is prepared, for example, by the oxidation of ammonia in contact burner or ammonia oxidizer 1. This gas mixture passes through the tube 2 into a heat exchanger or cooler 3. The steam generated in the heat exchanger 3 is led through the pipe 5 to the place where it is to be employed. The gas mixture passes into a condenser 4 after leaving the heat exchanger 3. The water vapour contained in the gas mixture is partially separated in said condenser 4, for example by water cooling and, until this water separation has taken place, the gases are given no oxidation space, $\frac{1}{3}$ of the water vapour resulting from the combustion of ammonia according to the equation

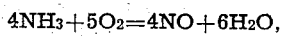

$$4NH_3 + 5O_2 = 4NO + 6H_2O,$$

is left in the gas mixture and the excess of the water vapour (which has resulted from ammonia or which has otherwise gained access to the nitrogen oxide mixture) is condensed and drawn off, practically free from acid through the tube 7. The water vapour remaining in the gas is separated, during or after the oxidation of the nitric oxide, as aqueous, (possibly nitrogen-tetroxide-containing) nitric acid. The gases pass through tube 8 (if desired with the addition of oxygen or air through the tube 9) at the top or at the bottom into a cooling chamber 10, which is cooled, for example, with water and gives off the condensate formed at 11. By suitable disposition of space and cooling surface a condensate of any desired composition, for example 40% or 80% nitric acid containing nitrogen tetroxide may be formed. The gas mixture conveyed through tube 12 is now converted into liquid, (possibly nitric acid-containing) nitrogen tetroxide, $N_2O_4$. Cooling is effected in liquefier 13 with brine at a low temperature which gives off liquid nitrogen tetroxide at 14, which can also be drawn off at 15 combined with aqueous nitric acid as a raw mixture suitable for working up, for example into highly concentrated nitric acid.

The gas mixture may be liquefied and then washed with a solvent or adsorbed. Dissolved and adsorbed or solid tetroxide may be added directly (or after melting or gasifying) to the liquid tetroxide, or to the liquefier, or to the mixture of nitrogen tetroxide and nitric acid.

Figure 2 illustrates the means for liquefying the gas mixtures and then washing them with a solvent, the dissolved tetroxide being added to the liquefier after gasification.

Figure 3 illustrates the means for liquefying the gas mixtures and then adsorbing them, the adsorbed tetroxide being added to the liquefier after gasification.

As shown in Figure 2, the gas mixture leaves the liquefier 13 through a pipe 16 and passes into a column 17, in which the nitrogen tetroxide is dissolved by a solvent (a known example of a good solvent is concentrated nitric acid, especially highly concentrated nitric acid), the end gas escaping through the pipe 18. The dissolved tetroxide can be removed through the pipe 19, or it can pass through the pipe 21, (which is provided with a valve and is connected with the pipe 19), and flow into the gas extractor 22. The dissolved tetroxide is gasified in the gas extractor 22 and the gaseous tetroxide is supplied to the liquefier 13 through the pipe 23. The column 17 is cooled with brine, which also cools the liquefier 13.

The nitric acid is introduced into the column 17 through the inlet 30.

Referring to Figure 3, the gas passes out of the liquefier 13 through 16, into an adsorber 24 and escapes at 25, whilst the previously employed adsorber 26 is freed from gas by heating, the gas leaving the adsorber 26 through the lead 23. 24 and 26 operate alternately in known manner (a large number of various adsorbers connected in another manner may also be employed. The cooling of the adsorbers is effected with brine, such as is employed for the liquefier 13 or with brine at a lower temperature.

The method of carrying the invention into effect described in the examples is suitable, for example, for working up any ammonia combustion mixtures, such as can be obtained from ammonia and atmospheric air or air rich in oxygen or from ammonia and oxygen in various concentrations. Thus catalytically oxidized mixtures of one part by volume of $NH_3$ with 1.5 to 2.5 parts by volume of oxygen, with or without the addition of steam in any desired proportion, for example 35 volume % $NH_3$ in oxygen may be worked up by this method with about 1 cu. metre total condensation space per ton of nitrogen converted per day at atmospheric pressure. Mixtures obtained from the combustion of ammonia with atmospheric air are worked up according to this method preferably under increased pressure, for example at 3 to 10 atms. etc. The pressure in this case may be extended over the whole plant or only over parts thereof; also when burning with oxygen, pressure may, for example, be employed at the end etc. On the other hand even the low percentage ammonia combustion mixtures obtainable with atmospheric air can be worked up in this manner at atmospheric pressure without previous liquefaction, for example by constructing the apparatus illustrated in Figures 2 or 3 in a suitable manner and connecting them at 12.

We claim:—

1. A process of treating gas mixtures containing nitrogen oxides, oxygen and water-vapor, which comprises condensing a portion of the water-vapor to form water substantially free of nitric acid, removing said condensate, condensing the residual water vapor and a portion of the nitrogen oxides to form nitric acid, and cooling the residual gases to low temperatures to obtain a further condensate.

2. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, and then liquefying the residual nitrogen oxides.

3. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, and absorbing the residual gas mixture at low temperatures.

4. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, liquefying a portion of the residual nitrogen oxides, and then absorbing the remainder with highly concentrated nitric acid, the liquefying and the absorption operations being carried out at low temperatures.

5. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, liquefying the residual nitrogen oxides and combining the nitric acid and the liquefied nitrogen oxides.

6. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, liquefying the residual nitrogen oxides, combining the nitric acid and the liquefied nitrogen oxides to form a liquid mixture thereof, and adding oxygen under pressure to this mixture to form highly concentrated nitric acid.

7. A process of treating gas mixtures containing nitrogen oxides, oxygen and water vapor, which comprises first condensing a portion of the water vapor to form water substantially free of nitric acid, removing said condensate, condensing the residual water vapor and the residual nitrogen oxides, the condensate consisting of a liquid mixture of water, nitric acid and nitrogen tetroxide, and adding oxygen under pressure to this mixture to form highly concentrated nitric acid.

8. A process of treating gas mixtures containing nitrogen oxides, oxygen and water vapor, which comprises first condensing a portion of the water vapor to form water substantially free from nitric acid, removing said condensate, adding oxygen to the resultant gas mixture, condensing the residual water vapor and a portion of the nitrogen oxides to form nitric acid, and cooling the residual gases at low temperatures.

9. A process of treating gas mixtures containing nitrogen oxides, oxygen and water vapor, which comprises first condensing a portion of the water vapor to form water substantially free from nitric acid, removing said condensate, adding oxygen to the resultant gas mixture, condensing the residual water vapor and the residual nitrogen oxides, to form a liquid mixture of water, nitric acid and nitrogen tetroxide, and adding oxygen under pressure to this liquid mixture.

10. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, and cooling the residual gases to low temperatures to obtain a further condensate, said process being carried out at a pressure substantially greater than atmospheric.

11. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, and cooling the residual gases to low temperatures to obtain a further condensate, the second condensing and the final cooling operations being carried out at a pressure substantially greater than atmospheric.

12. A process of treating gas mixtures containing nitrogen oxides, oxygen and water vapor, which comprises condensing a portion of the water vapor to form water substantially free of nitric acid, removing said condensate, condensing the residual water vapor and a portion of the nitrogen oxides to form nitric acid, and cooling the residual gases to low temperatures to obtain a further condensate, the final cooling operation being carried out at a pressure substantially greater than atmospheric.

NIKODEM CARO.
ALBERT RUDOLF FRANK.
RUDOLF WENDLANDT.
THOMAS FISCHER.